US007757548B2

(12) United States Patent
Delgado

(10) Patent No.: US 7,757,548 B2
(45) Date of Patent: Jul. 20, 2010

(54) CALIBRATED AIR INTAKE TRACT HAVING AIR INFUSION INSERT

(75) Inventor: Ron Delgado, Pomona, CA (US)

(73) Assignee: ARD Technology, LLC, Pomona, CA (US)

( * ) Notice: Subject to any disclaimer, the term of this patent is extended or adjusted under 35 U.S.C. 154(b) by 53 days.

(21) Appl. No.: 12/233,380

(22) Filed: Sep. 18, 2008

(65) Prior Publication Data

US 2009/0229556 A1 Sep. 17, 2009

Related U.S. Application Data

(60) Division of application No. 12/082,856, filed on Apr. 14, 2008, which is a continuation of application No. 11/511,907, filed on Aug. 28, 2006, now Pat. No. 7,359,795, and a continuation of application No. 11/893,577, filed on Aug. 15, 2007, now Pat. No. 7,669,571.

(51) Int. Cl.
*G01M 15/10* (2006.01)

(52) U.S. Cl. .............. 73/114.71; 73/114.31; 73/114.32; 73/114.72

(58) Field of Classification Search .............. 73/114.31, 73/114.32, 114.33, 114.34, 114.69, 114.71, 73/114.72, 114.73
See application file for complete search history.

(56) References Cited

U.S. PATENT DOCUMENTS

| | | | | |
|---|---|---|---|---|
| 4,345,569 | A * | 8/1982 | Hattori et al. | 123/549 |
| 4,571,996 | A * | 2/1986 | Wakeman et al. | 73/202.5 |
| 4,606,318 | A * | 8/1986 | Tsuchida et al. | 123/488 |
| 4,790,864 | A * | 12/1988 | Kostun | 96/388 |
| 5,359,975 | A * | 11/1994 | Katashiba et al. | 123/435 |
| 5,383,356 | A * | 1/1995 | Zurek et al. | 73/114.33 |
| 6,267,006 | B1 * | 7/2001 | Bugli et al. | 73/114.34 |
| 6,394,128 | B1 * | 5/2002 | Concialdi | 137/550 |
| 6,588,388 | B2 * | 7/2003 | Watanabe et al. | 123/184.36 |
| 6,915,203 | B2 * | 7/2005 | Maegawa et al. | 701/114 |
| 7,028,679 | B2 * | 4/2006 | Hillman et al. | 123/563 |
| 7,188,612 | B2 * | 3/2007 | Hattori | 123/494 |

* cited by examiner

*Primary Examiner*—Eric S McCall
(74) *Attorney, Agent, or Firm*—Steins & Associates, P.C.

(57) ABSTRACT

A Calibrated Air Intake Tract for Internal Combustion Engine is disclosed. The intake includes a Mass Airflow Sensor section that defines an inner diameter that differs from the diameter of the overall intake air tract piping. The Mass Airflow Sensor length and diameter are precision-tuned in order to provide the best engine performance without the typical "check engine" light being lit due to faulty mass airflow sensor readings. In those vehicles where necessary, an insert of the appropriate size and in the proper location is added to the interior wall of the MAFS section in order to correct final fuel trim level inadequacies.

7 Claims, 11 Drawing Sheets

A - A

CALIBRATED AIR INTAKE TRACT HAVING AIR INFUSION INSERT

The present invention is a continuation of application Ser. No. 11/511,907, filed Aug. 28, 2006, now U.S. Pat. No. 7,359, 795 and application Ser. No. 11/893,577, filed Aug. 15, 2007, now U.S. Pat. No. 7,669,571. This application is further a divisional application of pending application Ser. No. 12/082, 856, filed Apr. 14,2008; no new matter has been entered.

BACKGROUND OF THE INVENTION

1. Field of the Invention

This invention relates generally to internal combustion engines and accessories therefor and, more specifically, to a Calibrated Air Intake Tract having Air Infusion Insert.

2. Description of Related Art

For the sake of this discussion, the phrase "intake system" is being used to describe the ducting and accessories that feed air to an internal combustion engine prior to the throttlebody, including the large duct, filter, and any other parts thereof. FIG. 1 is a schematic diagram of an internal combustion engine's intake tract. The mass airflow sensor 26 and emissions/central computer 28 are depicted here for reference, but will be described more fully in connection with FIG. 2 and beyond.

The original equipment manufacturer (OEM) intake system 14 on a typical production vehicle consists of an air inlet 23 leading to a resonator 16, a substantial amount of plastic duct work 18, a large metal or plastic air filter canister 20, a paper air filter element 22, and a rubber accordion hose 24 between the filter canister and the throttlebody. Usually, the intake system 14 will pick up air from behind the vehicle's fender or bumper, from the leading end of the plastic duct work and resonator. This design is the most favorable for OEM systems because the air taken in by the intake system is cooler than if the air was being taken from inside the engine compartment. Cooler air allows the engine to make more power than hot air. In cases where the intake system takes air from inside the engine compartment lower-power performance from the engine should be expected.

Even if the OEM intake system is taking its air from outside the engine compartment, there still are performance-sapping design aspects to virtually all OEM intake system designs. First, the resonator 16 and the plastic duct work 18 tend to be very restrictive to air flow. These pieces are designed to reduce intake sound (i.e. engine sound), and therefore performance is not the priority. Performance can be improved by eliminating the resonator 18, reducing the ductwork length and increasing the ductwork diameter.

Second, the OEM paper filter element 22 is usually a very low-cost, disposable unit. Paper elements typically restrict flow more than cotton gauze or cloth. "Aftermarket" cotton gauze or cloth filters provide a great deal more air flow with the added advantage that they are reusable and can be washed, re-oiled, and reinstalled in the intake tract for ten years of use, or more.

Third, the accordion hose 24 between the filter canister 20 and the throttlebody 25 does not encourage very good air flow. The ribs of the hose 24 extend into the air flow channel and cause turbulence, thereby reducing and/or corrupting the airflow in this section of the intake tract 14.

One of the most popular horsepower-improving aftermarket products for vehicles is the "cold air intake" system. As the name suggests, one thing that these systems do is to locate (or relocate) the front end of the air intake tract to a location that is outside of the engine compartment (many times behind the vehicle's bumper).

The most common and most effective cold air intake 30 design is depicted in FIG. 2. These systems use sections of mandrel bent pipe 32, connected with turbo hose connectors 34, leading from the throttlebody 25 and out of the engine compartment to the area behind the bumper or behind the fender, where a cone filter 36 is fitted to the pipe 32 to draw in cool air from outside the engine compartment. The combination of the cooler intake air and the reduction in flow resistance results in significant power increase. In addition, the modified intake tract 30 will typically be three or more feet in length, causing it to effectively act as an extension of the intake manifold of the engine, almost as if it were a header for the intake side of the engine, improving low and mid range torque.

Furthermore, the added length of the pipe work also encourages something called "laminar air flow effect" whereby the air passing through the pipe is unobstructed and begins to act somewhat more like a liquid than a gas, gaining momentum as it passes down the pipe and resisting anything that would stop its flow. This is known as an air ramming effect.

While the power improvements made available by cold air intake systems 30 are well-known, so are the problems associated with them. First, the OEM intake tract 14 has a "Mass Airflow Sensor" (MAFS) 26 attached to it. The MAFS 26 is a very important sensor that detects the airflow in the intake tract and reports this information to the engine's central computer 28. The central computer 28 uses this information to adjust the combustion performance factors of the engine so that the engine runs cleanly (low emissions) and smoothly.

It has been common to receive "check engine" lights when installing aftermarket cold air intake systems in vehicles because the flowrate of the incoming air has increased so much (because Me theory has always been "more is better") that the values are outside those expected by the central computer 28. In fact, some vehicle models and/or intake systems suspected to actually cause damage to the engine.

One solution for the check engine light problem has been to replace the MAFS 26 with a non-OEM unit that will scale down input to the central computer 28 so that it will be within the expected range. This is dangerous and further may actually void the manufacturer's warranty on the engine. The only other solution has been to reprogram (or "tune") the central computer 28 so that the MAFS 26 input is within the newly-programmed computer's range. This approach, while effective, only serves to add cost and uncertainty to the intake system "upgrade."

What is really needed is an aftermarket intake system and method for custom-designing such system so that the OEM MAFS and central computer system can be retained after the installation of the high-performance cold air intake system.

SUMMARY OF THE INVENTION

In light of the aforementioned problems associated with the prior devices and methods, it is an object of the present invention to provide a Calibrated Air Intake Tract having Air Infusion Insert. The intake should have a Mass Airflow Sensor section that defines an inner diameter that differs from the diameter of the overall intake air tract piping. The Mass Airflow Sensor length and diameter should be precision-tuned in order to provide the best engine performance without the typical "check engine" light being lit due to faulty mass airflow sensor readings. In those vehicles where necessary, an insert of the appropriate size and in the proper location should be added to the interior of the MAFS section in order to correct final fuel trim level inadequacies.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, of which:

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art since the generic principles of the present invention have been defined herein specifically to provide a Calibrated Air Intake Tract having Air Infusion Insert.

Figure 1:
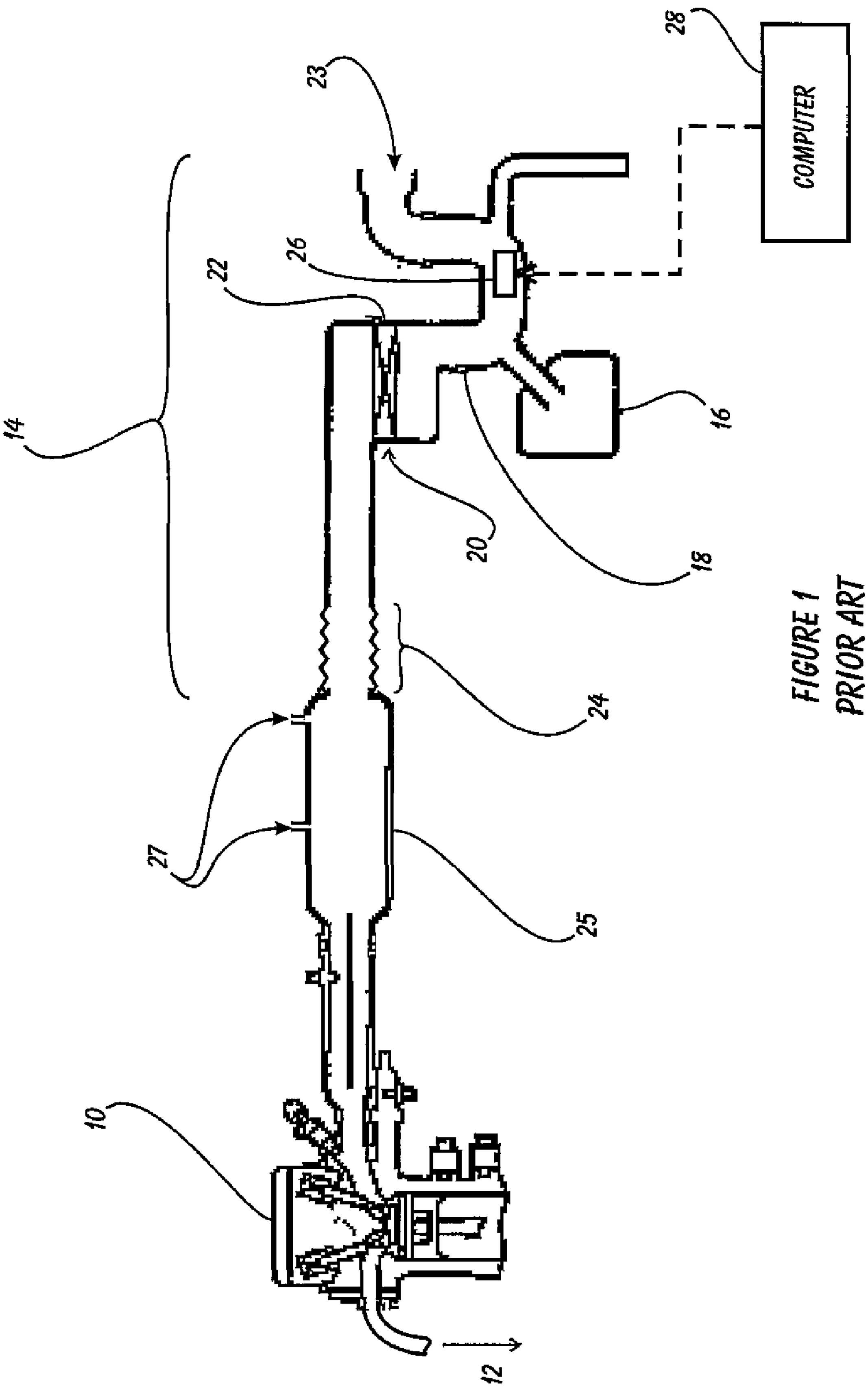
FIGURE 1 PRIOR ART
FIG. 1 is a schematic view of a conventional internal combustion engine and associated air intake tract.
Figure 2:
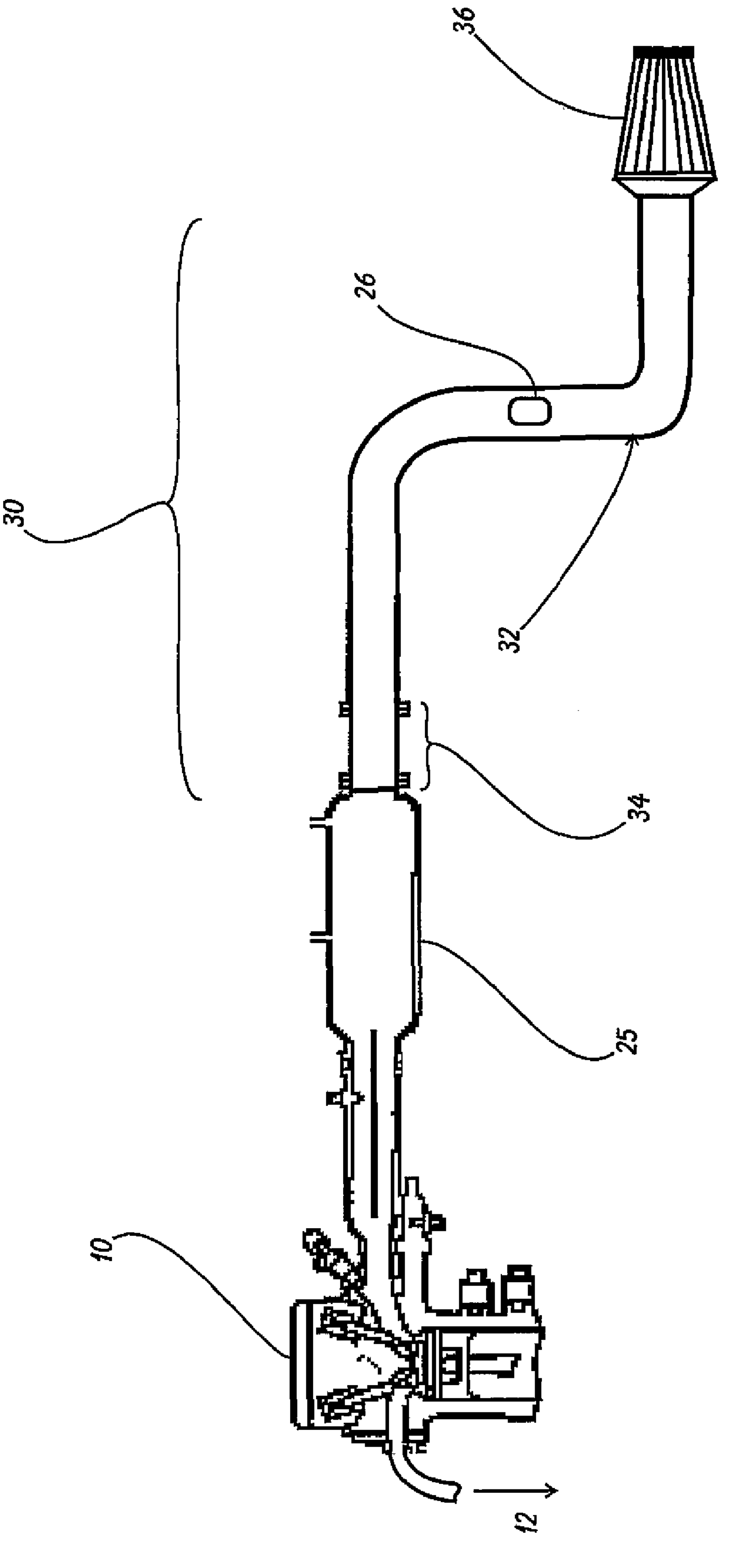
FIGURE 2 PRIOR ART
FIG. 2 is a schematic view of a conventional cold air intake system.
Figure 3:
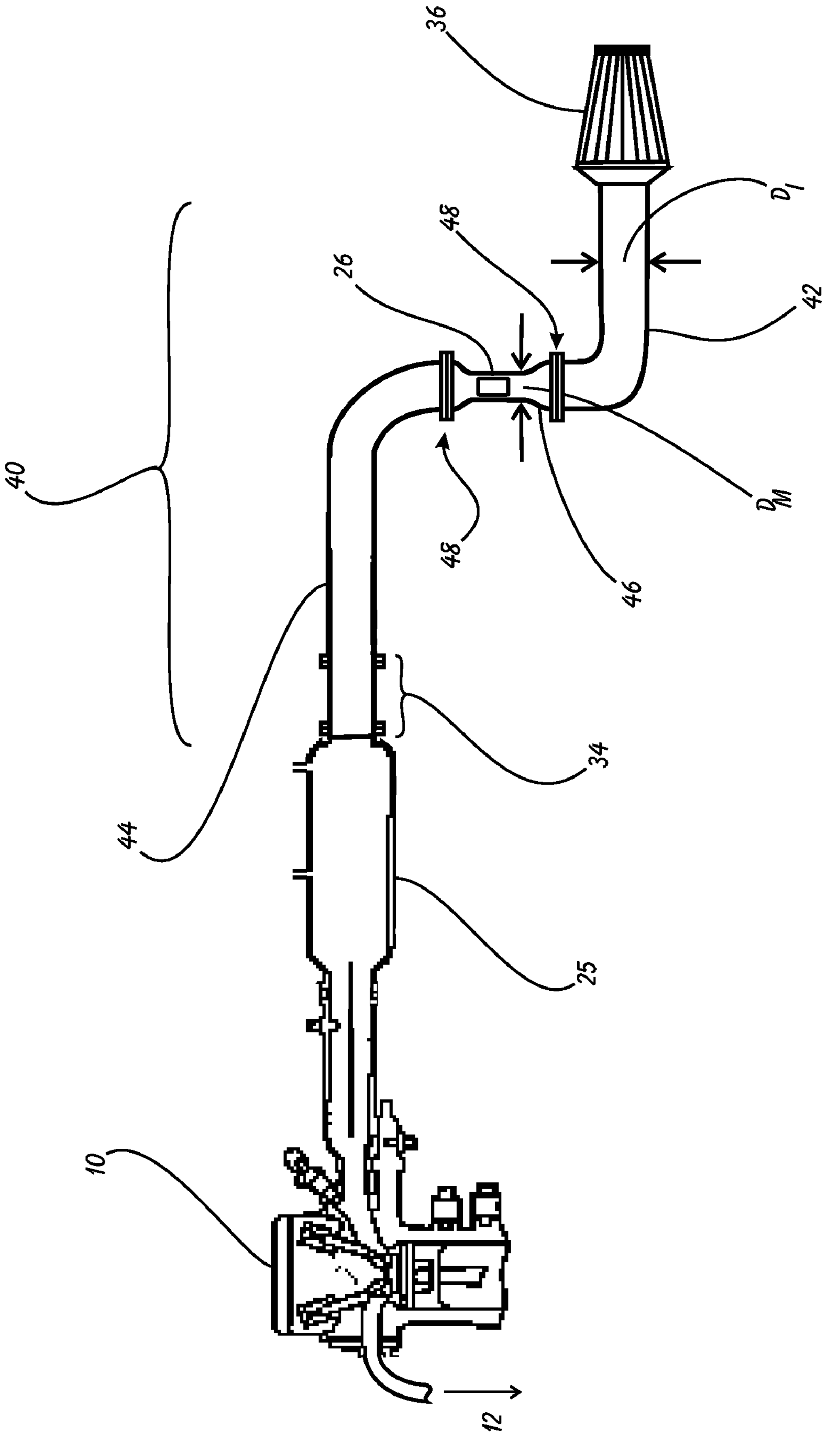
FIG. 3 is a preferred embodiment of a combustion-tuning cold air intake test system for use with the present method invention.

The present invention can best be understood by initial consideration of FIG. 3. FIG. 3 is a preferred embodiment of a combustion-tuning cold air intake test system 40 for use with the method of the present invention. The test system 40 is designed to provide the inventor with the necessary equipment to execute the cold air intake tuning method of the present invention, the completion of which will provide the inventor with the necessary information to produce production-quality, combustion-tuned cold air intake systems for each vehicle and/or model tested using the method.

The system 40 is similar to a conventional cold air intake system in that it has a cone filter 36 and turbo hose connectors 34 for attaching the system 40 to a conventional internal combustion engine. Rather than having a simple mandrel-bent piping system, however, the piping of the test system 40 can be modified quickly in the course of the testing process so that the desired combustion performance is attained. There is a distal intake pipe section 42 making up the first leg of the system 40. There is a proximal intake pipe section 44 making up the final leg of the system 40. Interconnecting the two sections 42 and 44 is the mass airflow sensor (MAFS) tract 46. The MAFS tract 46 is a customized pipe section selected from a group of tracts constructed for the purpose of being used in the test system 40. The OEM MAFS 26 (for the vehicle that the system testing is for) is attached to the tract 46 so that the airflow through the system 40 is sampled. Each MAFS tract 46 has flanged 48 ends so that tracts 46 can be installed and removed without disassembling the other components of the test system 40.

The MAFS tract 46 defines an inner (towpath) diameter of $D_M$. This diameter may be larger than, or smaller than $D_I$, which is the diameter of the distal and proximal sections 42 and 44, depending upon the test results, as will be discussed in connection with FIG. 4. What is critical to understand is that the configuration of the distal and proximal intake pipe sections 42 and 44 will not change during the testing process. These sections will be designed to fit within the profile of the engine compartment of the vehicle undergoing design testing, with a standardized gap left between the flanges 48 so that standard-sized MAFS tracts 46 can then be exchanged to fill this gap. The optimum internal diameter of the MAFS tract 46 will be determined by the testing process of FIG. 4. For the purposes of FIG. 4, the "test intake tract system" refers to the test system 40 minus the MAFS tract 46.

Figure 4:
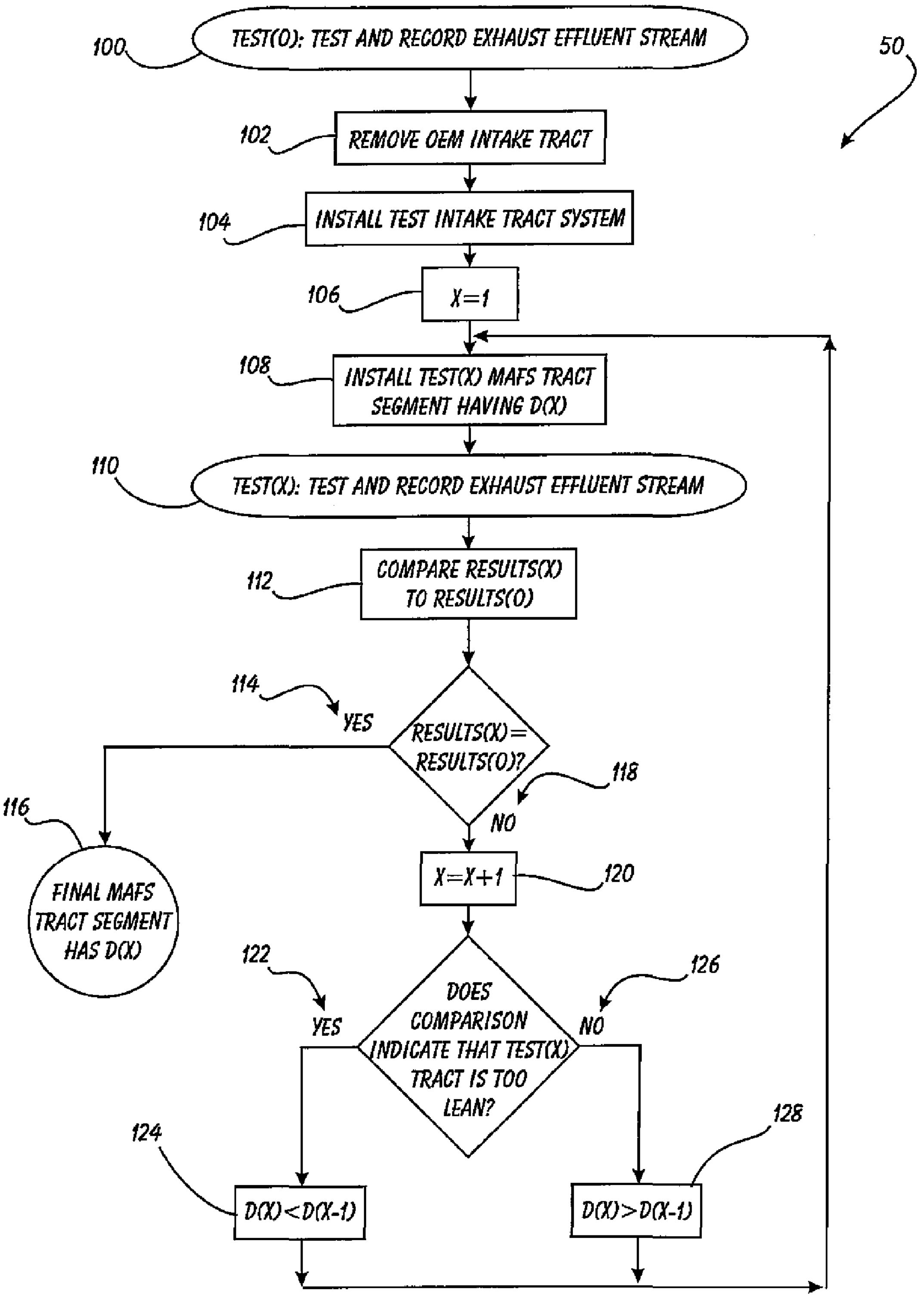
FIG. 4 is a flowchart depicting the preferred combustion tuning method for mass airflow segment.

FIG. 4 is a flowchart depicting the preferred combustion tuning method 50 for mass airflow segment. What is very unique to this method is that the intake air tract (at least the diameter of that portion in the vicinity of the MAFS) is being optimized by testing being done on the exhaust effluent stream. The idea is that if the intake can be "tuned" until the content of the exhaust effluent stream very nearly matches the content of his stream with the original equipment manufacturer intake air tract installed.

First, the exhaust effluent stream is tested having the OEM intake air system installed 100 (and recorded). Next, the OEM intake tract is removed 102 and the test intake tract 104 is installed in place of the OEM system. The step X=1 106 serves to increment the test set as the method iterates.

Next, a selected MAFS tract segment is installed in the test system 108. Here, Test(1) refers to a MAFS tract segment having an internal diameter of D(1) is installed in the system. Next, Test(1) is ran by running the engine and testing the exhaust effluent stream content 110. The results of Test(1) are compared to the results of Test(0) 112. If the effluent content is substantially file same for Test(1) as were the results of Test(0) 114, then the Final or Optimum MAFS tract segment diameter is determined to be D(1) for this particular powerplant.

If the exhaust stream content of Test(1) is not substantially the same as it was for Test(0) 118, then after incrementing X to set up the next test 120, the query of whether Test(X) results indicated that the engine was running too lean or too rich. If the results indicate that MAFS(1) caused excessively lean conditions 122, then the next MAFS will be chosen so that its diameter is smaller than the diameter of the MAFS used in Test(1) 124. If the results indicate that MAFS(1) caused excessively rich conditions 126, then the next MAFS will be chosen so that its diameter is larger than the diameter of the MAFS used in Test(1) 128.

Once the new diameter is determined (as being larger or smaller than for the previous test), step 108 and beyond are executed again using MAFS(2) (in his case), having the appropriate diameter as determined by the exhaust effluent stream contents.

As discussed earlier, once the original OEM exhaust performance is nearly duplicated, the test is concluded and the internal diameter of the MAFS tract segment has been optimized 116. With the optimized MAFS tract segment installed, the "check engine" lights will no longer be received because the airflow, as determined by the MAFS in the MAFS tract segment having the optimized diameter (as well as the other emissions sensors in the vehicle) will conclude that OEM conditions are being maintained.

Figure 5:
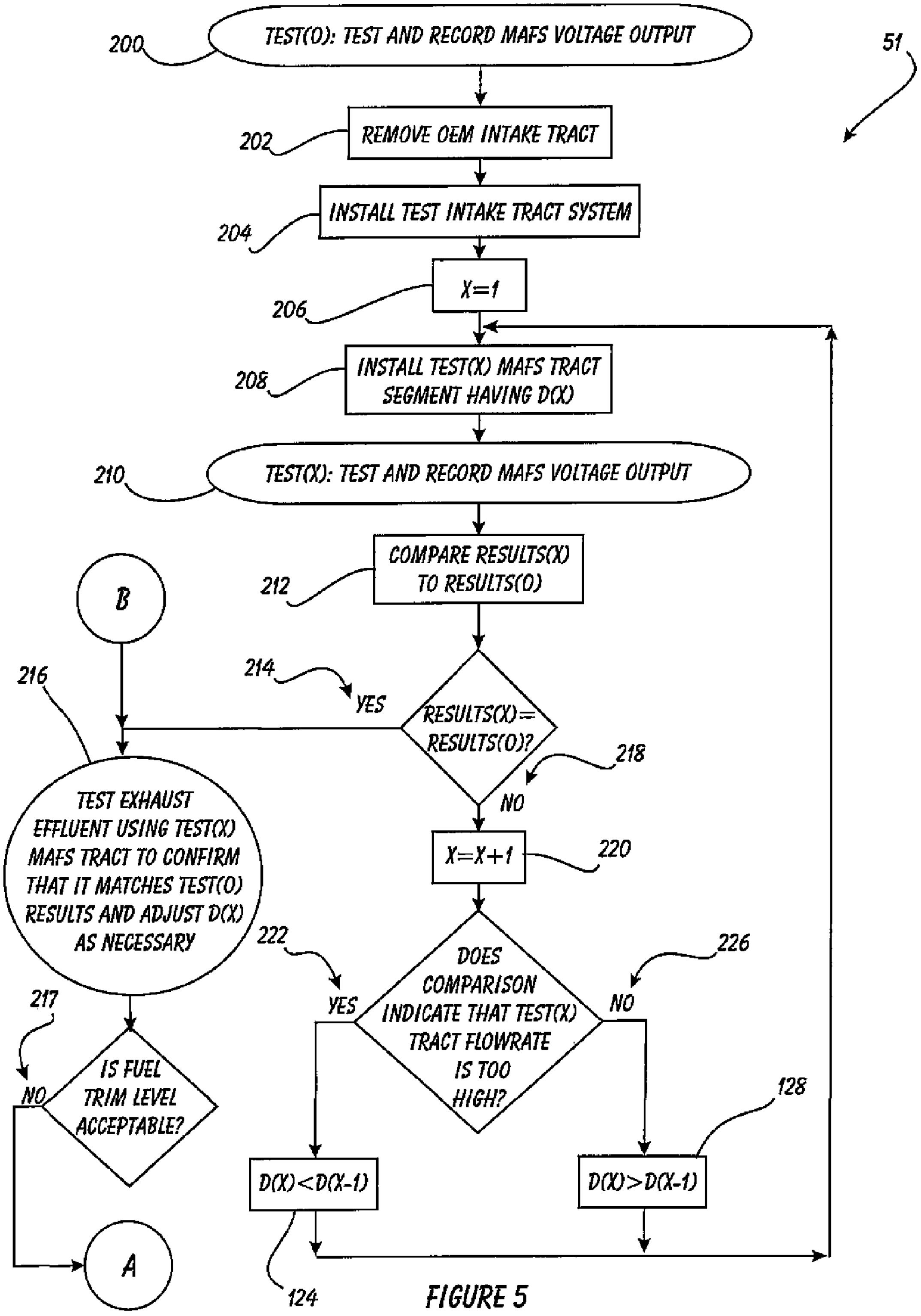
FIG. 5 is a flowchart depicting a second preferred method for combustion tuning the mass airflow segment, as modified for systems having persisting fuel trim level errors.

Since the aforementioned testing method can tend to consume a large amount of time and resources, a second version of this test method was developed; FIG. 5 depicts this alternate method.

FIG. 5 is a flowchart depicting a second preferred method for combustion tuning the mass airflow segment. Preliminarily (not shown here), the system is tested for exhaust gas emissions contents so that a final comparison can be made (see step 216). While This step is not mandatory, it does confirm the results achieved in the "bench" testing approach described herein below.

First, 200, the voltage output (or other form of signal output) of the MAFS is tested and recorded for the OEM intake system. Next, the OEM intake tract is removed from the engine 202. The test intake tract system is then installed 204 on the IC engine. For test(1), the test(1) MAFS tract segment having D(1) is installed in the test tract 208. The engine is started and the voltage (or other format) signal output of the MAFS is observed and recorded 210. The signal output results for test(1) are compared with the signal output results of the baseline test(0). If they are unacceptably different 218, then the MAFS tract segment will be exchanged with another segment having a diameter that is either greater or smaller than the test(1) segment (124 or 128), and the test 208-212 is re-run. These tests are run until such time as the MAFS signal output matches (or nearly) the baseline MAFS signal output results 214.

In order to assure a correct configuration, the system is still combustion tested, namely, 216 the exhaust effluent is retested with the optimized MAFS tract segment installed (i.e. the segment having the configuration dictated by the "bench" testing), and compared to the baseline exhaust gas test results obtained when the system was first profiled prior to executing step 204.

By running the initial calibrations on the system through bench testing of voltage output, the system can be reconfigured even more quickly than before (because the effluent testing tends to be much more time consuming), the optimized test tact configuration can be determined much more quickly than with the method of FIG. 4. To be safe, however, the final test of FIG. 4 is still run to confirm the optimization of the combustion as well.

It has been noticed that certain intake and engine setups will not reach optimal power improvements and the other benefits by applying the empirically-based testing of the methods of either FIG. 4 or 5. Exemplary vehicles are late model (as of this writing) Nissan™ vehicles. In these vehicles, the implementation of a restricted-diameter MAFS section is not insufficient, and the fuel trim level is not acceptable 217. The details of file importance of fuel trim and the adjustments to the method of FIG. 5 are discussed below in connection with FIG. 9.

Figure 6:
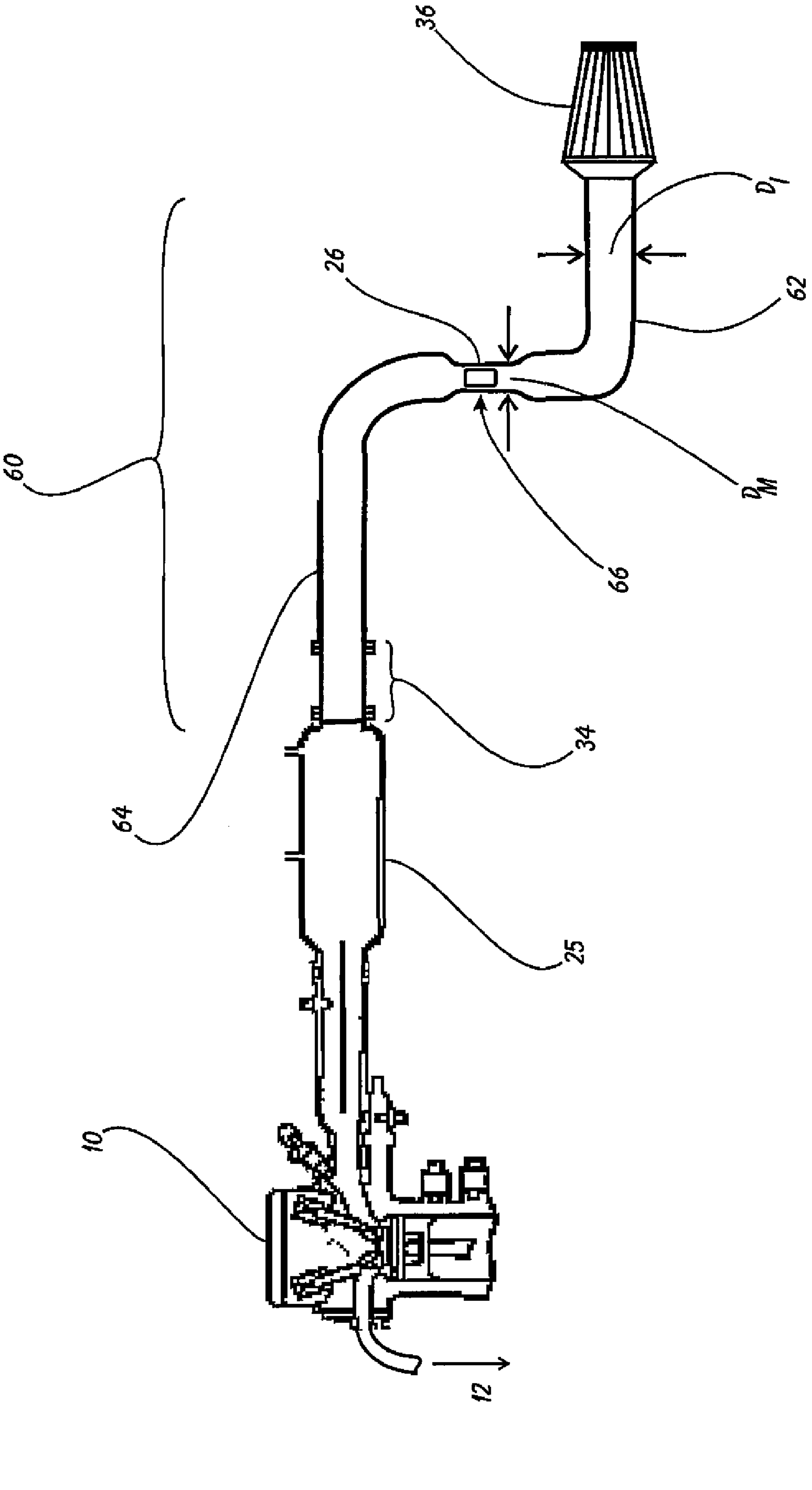
FIG. 6 is a schematic view of a combustion-tuned cold air intake system of the present invention.

Regarding FIGS. 4 and 5, FIG. 6 shows the result of the aforementioned testing of the methods of these drawing figures.

FIG. 6 is a schematic view of a combustion-tuned cold air intake system 60 produced by the method of the present invention. What has changed here, as compared with the system of FIG. 3 is that the test MAFS segment no longer exists. Here, the piping is in one piece—defied by the distal intake pipe portion 62 and the proximal intake pipe portion 64 interconnected by the MAFS pipe portion 66. As should be apparent the MAFS pipe portion 66 has an internal diameter $D_M$ that was determined through the testing discussed above in connection with FIG. 4 to be the optimum diameter for this particular system 60. Since the distal intake pipe portion 62 and the proximal intake pipe portion 64 essentially duplicate the shape and parameters of the distal and proximal intake pipe sections 42 and 44, there should be no variation in performance aspects between the test system and this final production system 60. Finally, if we turn now to FIG. 7, we can examine the specifics of the test section.

Figure 7:
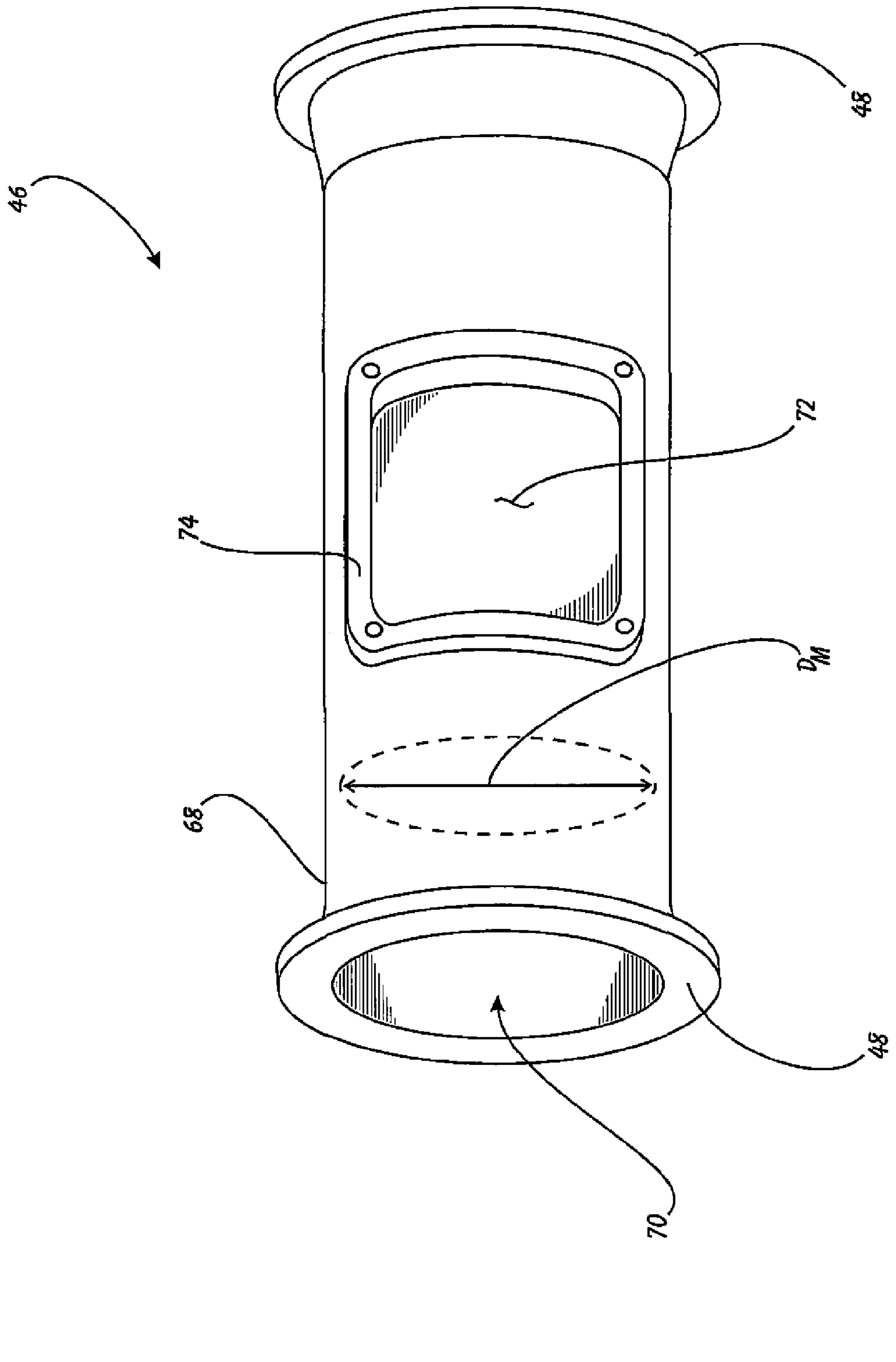
FIG. 7 is a perspective view of a mass airflow sensor tract used in the method of calibrating the MAFS section of the system of the present invention.

FIG. 7 is a perspective view of a mass airflow sensor tract 46 used in the method of the present invention. The tract 46 has a generally tubular center section 68 terminating in flanges 48 for connection to the test tract system. The airflow path 70 has an internal diameter $D_M$ that is known—for the purposes of testing according to the claimed method, a group or series of tracts 46, each having a unique $D_M$ must are first created in order to provide for the necessary responsiveness to test results.

The wall of the tubular section 68 has an MAFS aperture 72 formed in its side, the perimeter of which is defined by a flange 74 for attaching the OEM MAFS thereto. Since there is no standardized MAFS design that all OEMs use, there must be a variety of tracts 46 having the same flange/aperture configuration, but for different internal diameters $D_M$. Once the groups of tracts 46 are assembled, testing can be conducted on a wide variety of internal combustion power systems so that the final system design can be ascertained without risk.

Once the aforementioned calibration method is complete and a particular vehicle intake tract has been "tuned," a complete intake tract having a "tuned" MAFS pipe portion can be created. Such a pipe portion is depicted in FIG. 8.

Figure 8:
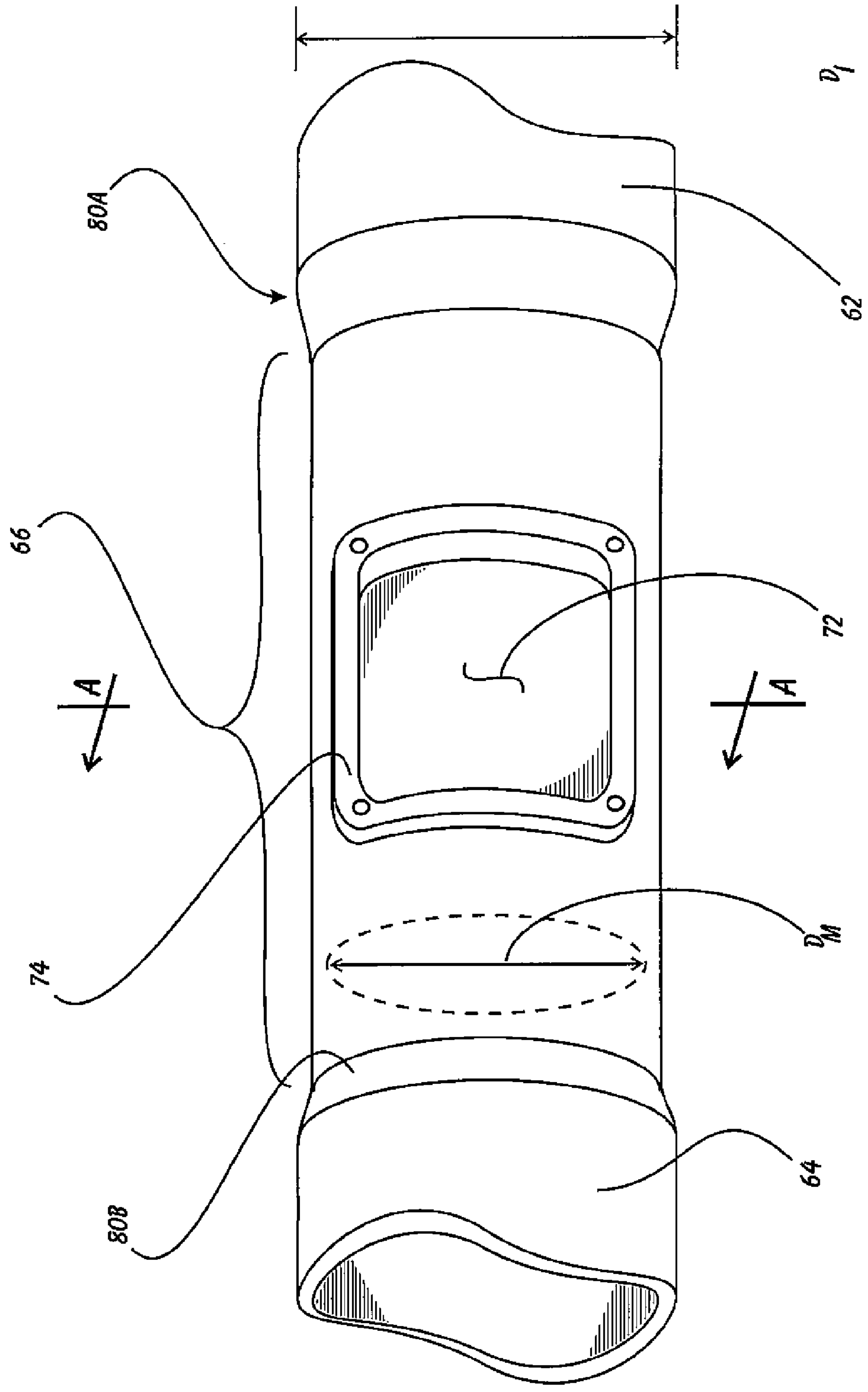
FIG. 8 is a perspective view of the MAFS pipe portion of the system of the present invention depicted above in FIG. 6.

FIG. 8 is a perspective view of the MAFS pipe portion 66 of the intake system of FIG. 6. While $D_M$ may be larger than $D_I$, the typical case is as depicted here. The distal intake pipe portion 62 is defined by a diameter $D_I$. The intake pipe then tapers down at the first neck portion 80A to $D_M$, which is carried continuously through the MAFS pipe portion 66. At the second neck portion 80B, the pipe diameter expands again to $D_I$, where it remains through the remainder of the intake tract.

The MAFS mounting flange 74 is positioned on the side of the pipe within the MAFS pipe portion 66, surrounding the MAFS aperture 72 formed within it. The first and second neck portions 80A, 80B are formed seamlessly within the intake piping. Since the neck portions 80A, 80B are formed in the continuous pipe, rather being made from welded pieces into the tract the inner surface of the entire intake tract is smooth. The smooth interior surface inhibits turbulent flow within tie tract, thereby providing smooth, predictable intake air flow and consistent horsepower increases.

Figure 9:
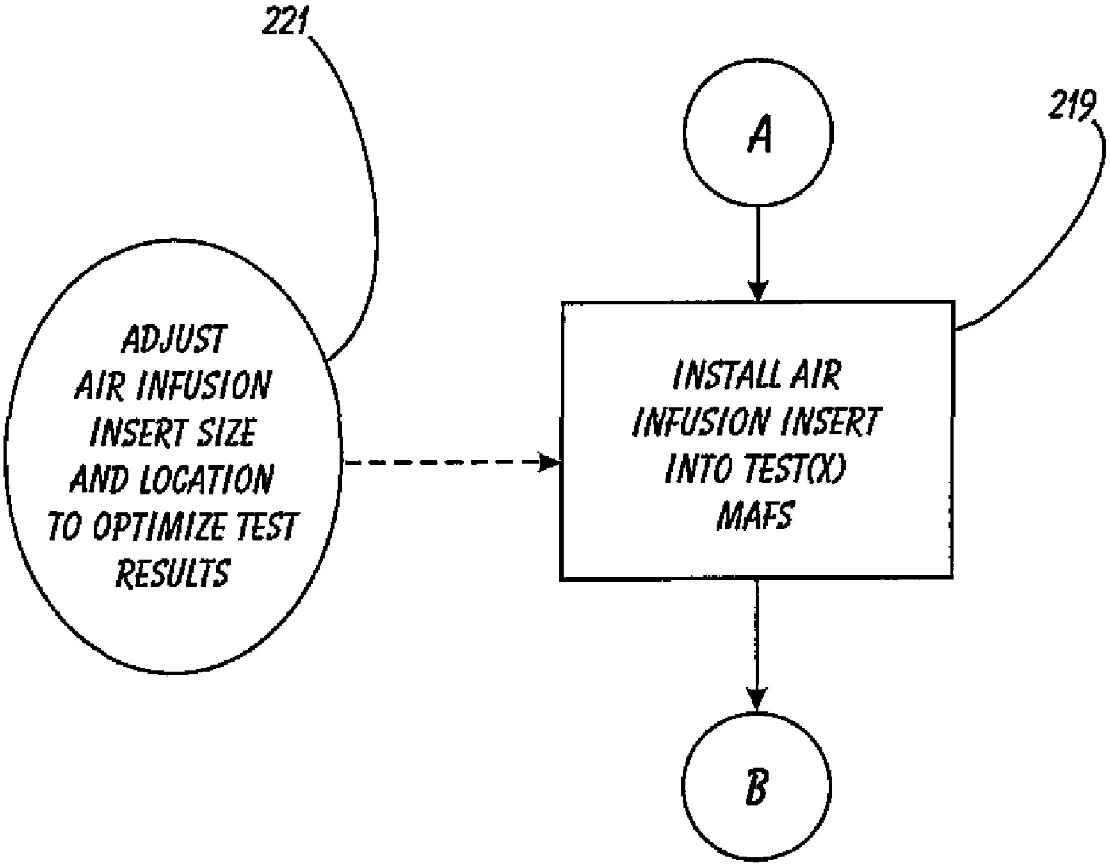
FIG. 9 is a modification to the flowchart depicted above in FIG. 5.

FIG. 9 is a modification to the flowchart depicted above in FIG. 5. As discussed above in connection with FIG. 5, it has been determined that some vehicles do not respond favorably to the tuning methods of FIGS. 4 and 5. Although an optimal diameter for the MAFS section of intake piping can be determined, there is very little gain in horsepower. It is believed that this phenomena is related to the fuel trim controls in the engine control computer.

Fuel trim is a term that refers to the adjustment of feedback signals emanating in a variety of engine combustion sensors. The purpose of fuel trim is to adjust fuel to air mixture so that the desired levels are maintained for the changing running conditions of an internal combustion engine.

There arc two types of fuel trim—short range and long range. Short term fuel trim is the adjustment of feedback signals for conditions that are only temporary in nature. The settings for short term fuel trim are generally re-zeroed in between engine starts.

Long term fuel trim is the adjustment of the signals to compensate for persistent conditions (conditions that exhibit their change over a prolonged period of time), such as dirty fuel injectors or other vehicle-to-vehicle differences. Long term fuel trim settings are maintained between starts.

Fuel trim is expressed as a percentage, and is typically calculated by considering numerous sensor values, including front O2 sensors, intake air temperature/pressure (or MAFS reading), engine temperature, anti-knock sensors, engine load, throttle position and change thereof, and even battery voltage.

Figure 10:
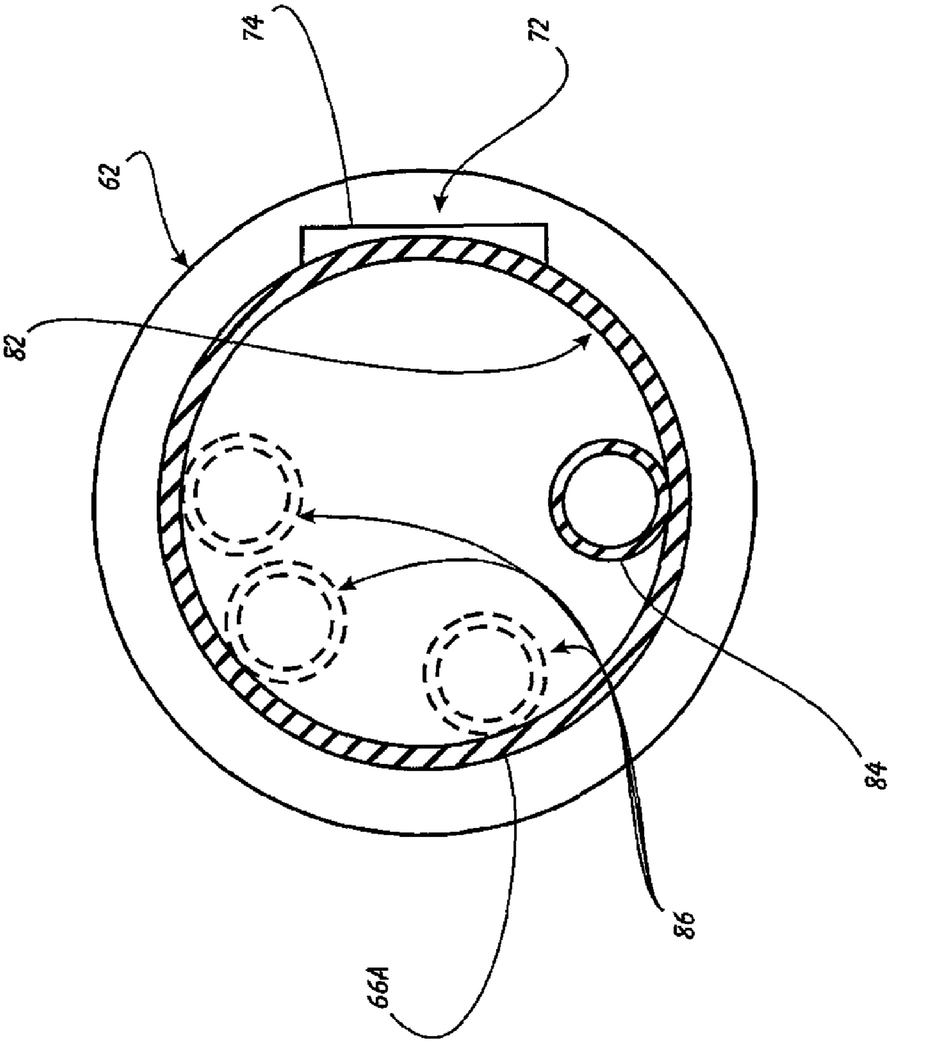
FIG. 10 is a cross-section of the MAFS section of the present invention further including examples of a preferred air infusion insert.

Once it is determined that the methods of FIG. 4 or 5 are insufficient to overcome conditions in the fuel trim level of the emissions control system of a particular engine, an air infusion insert is inserted into the MAFS section for the latest test 219. It is believed that the air infusion insert somehow conditions the air flow within the MAFS section of piping so that the fuel trim computation compensates in a way the increases available horsepower. Several exemplary systems so modified were able to add at least ten horsepower to the engine's output. The diameter and location of the air infusion insert can also effect the engine performance, so these conditions are preferably altered and the system retested 221 until the optimum size and location of insert is determined. FIG. 10 introduces the technical details of the air infusion insert.

FIG. 10 is a cross-section, along section A-A of FIG. 8, of the MAFS section 66A of the present invention further including examples of a preferred air infusion insert. The MAFS section depicted here is identified as 66A to denote that it is a modified version of the section shown in FIG. 8. The modification involves the addition of the air infusion insert 84 within the inner chamber of the MAFS section 66A.

Figure 11:
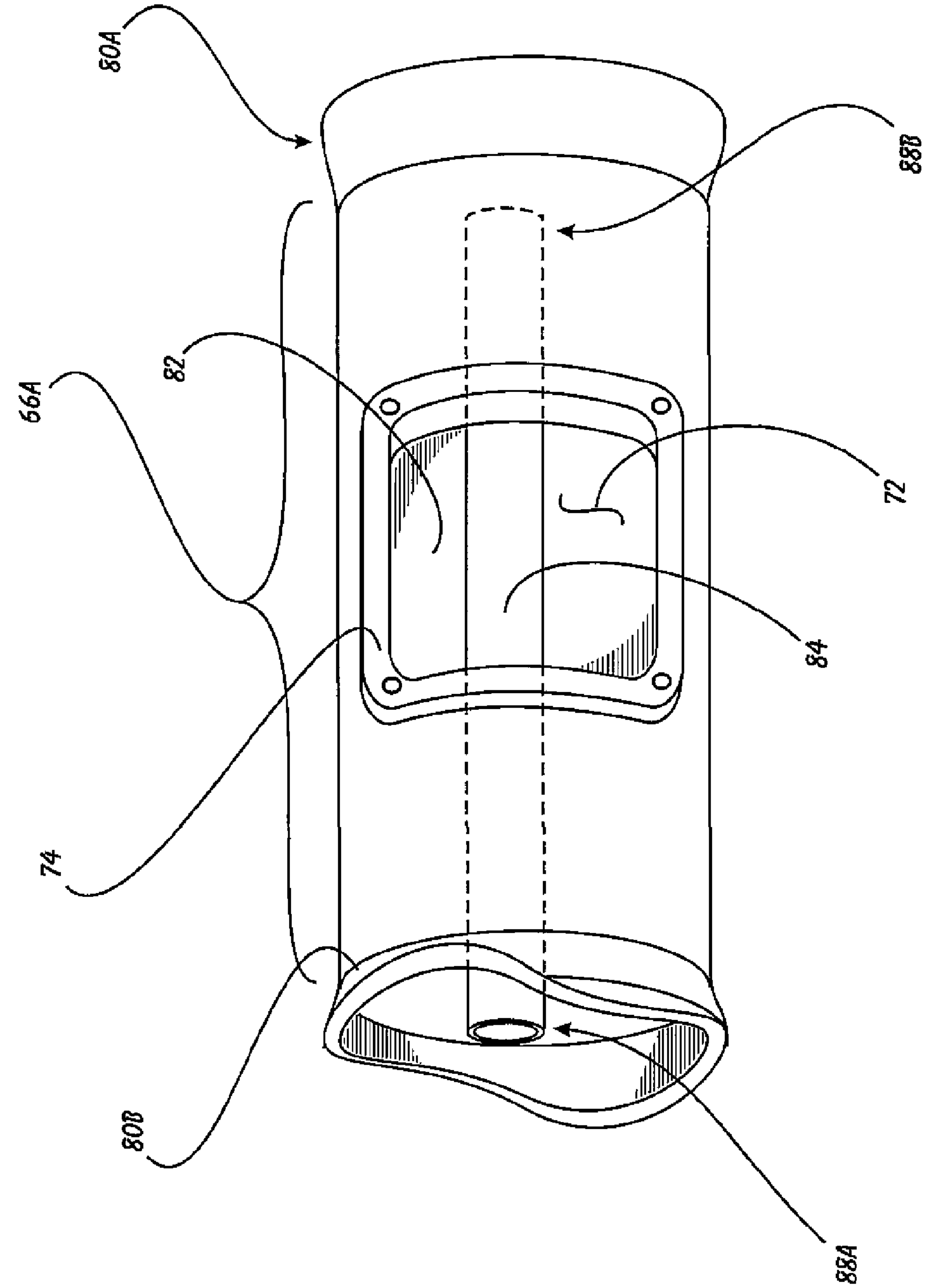
FIG. 11 is a partial cutaway perspective view of the MAFS section of FIG. 10.

In this depiction, the insert 84 is shown at ninety degree separation from the MAFS flange 74 and MAFS aperture 72. The insert 84 may also be positioned in virtually any other sidewall location (see examples 86) around the circumference of the inner wall 82 of the MAFS section 66A in order to provide the optimum performance result. Testing has revealed that the diameter of the insert 84 is to be chosen from a group of diameters, including ½ inch, ⅝ inch ¾ inch and ⅞ inch. Other diameter (smaller than the diameter of the MAFS section 66A) would likely be feasible, however, diminishing return is expected for very small incremental changes in diameter. FIG. 11 gives another view of the insert.

FIG. 11 is a partial cutaway perspective view of the MAFS section 66A of FIG. 10. As shown here, the insert 84 is defined by a first open end 88A, a second open end 88B and a main tubular middle section. Its length is equal to or less than the overall length of the MAFS section 66A. What is critical is that the insert is oriented along the same longitudinal flow path as the MAFS section 66A, so that the air flowing through the intake tract is not disturbed by its presence.

Those skilled in the art will appreciate that various adaptations and modifications of the just-described preferred embodiment can be configured without departing from the scope and spirit of the invention. Therefore, it is to be understood that within the scope of the appended claims, the invention may be practiced other than as specifically described herein.

"Supplemental Definitions:

10 Internal combustion engine;

12 Exhaust manifold; and

27 Vacuum sensor ports"

What is claimed is:

1. A method for creating an intake air system for an internal combustion engine, comprising the steps of:

running the engine;

testing the exhaust gas composition of the engine during said running;

replacing the intake air system of the engine with a proposed intake air system defined by a mass airflow sensor diameter;

rerunning the engine;

retesting the exhaust gas composition of the engine during said rerunning; and constructing a replacement intake air system comprising a distal intake pipe section and a mass airflow sensor tract selected from a group of mass airflow sensor tracts and further having an air infusion insert located within said mass airflow sensor tract, said air infusion insert comprising an elongate tubular member, said constructing responsive to said retesting.

2. The method of claim 1, wherein said constructing comprises said air infusion insert comprising an elongate tube attached to a wall of said mass airflow sensor tract.

3. The method of claim 2, wherein said constructing comprises said air infusion insert comprising an elongate tube having a diameter of less than one inch.

4. The method of claim 3, wherein said replacing, rerunning and retesting steps are repeated until said exhaust gas composition of said retesting is substantially the same as said exhaust gas composition of said testing.

5. The method of claim 4, wherein said replacement intake air system defines a mass airflow sensor diameter substantially equal to said mass airflow sensor diameter of said proposed intake air system when said exhaust gas composition of said retesting is substantially the same as said exhaust gas composition of said testing.

6. The method of claim 5, wherein said proposed intake air system of said replacing step comprises a distal intake pipe section and a mass airflow sensor tract selected from a group of mass airflow sensor tracts.

7. The method of claim 6, wherein each said group of said mass airflow sensor tracts of said replacing step is defined by a plurality of mass airflow sensor tracts, each said tract defining an internal diameter defined as said mass airflow sensor diameter that is distinct from the mass airflow sensor diameters of the other said mass airflow sensor tracts of said group.

* * * * *